United States Patent
Cavanna et al.

(10) Patent No.: US 10,556,403 B2
(45) Date of Patent: Feb. 11, 2020

(54) WELDING PROMOTING ELEMENT FOR A CLOSURE OF AN OPENING DEVICE

(71) Applicant: Tetra Laval Holdings & Finance S.A., Pully (CH)

(72) Inventors: Diego Cavanna, Formigine (IT); Livio Veronesi, San Felice sul Panaro (IT); Massimiliano Cereda, Modena (IT); Davide Corradi, Modena (IT); Rocco De Paola, Modena (IT); Domenico Didonna, Modena (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 16/081,447

(22) PCT Filed: Feb. 22, 2017

(86) PCT No.: PCT/EP2017/054068
§ 371 (c)(1),
(2) Date: Aug. 31, 2018

(87) PCT Pub. No.: WO2017/148771
PCT Pub. Date: Sep. 8, 2017

(65) Prior Publication Data
US 2019/0344540 A1 Nov. 14, 2019

(30) Foreign Application Priority Data
Mar. 4, 2016 (EP) .................................. 16158756

(51) Int. Cl.
*B32B 15/085* (2006.01)
*B65D 47/12* (2006.01)
(Continued)

(52) U.S. Cl.
CPC .............. *B32B 15/085* (2013.01); *B32B 3/30* (2013.01); *B32B 7/12* (2013.01); *B32B 15/20* (2013.01);
(Continued)

(58) Field of Classification Search
CPC ...... B65D 5/747; B65D 5/749; B65D 47/122; B65D 53/04; B65D 2251/02;
(Continued)

(56) References Cited

U.S. PATENT DOCUMENTS 3,355,059 A 11/1967 Balocca et al.
4,475,274 A * 10/1984 Beckstrom ........... B65D 47/123
215/392

(Continued)

FOREIGN PATENT DOCUMENTS

EP  2 886 479   6/2015
RU  2346869 C2  2/2009

OTHER PUBLICATIONS

Decision to Grant in corresponding Russian Application No. 2018131517 dated May 31, 2019 (5 pages).
(Continued)

*Primary Examiner* — Patrick M. Buechner
(74) *Attorney, Agent, or Firm* — Finnegan, Henderson, Farabow, Garrett & Dunner, L.L.P.

(57) ABSTRACT

A welding promoting element for an opening device is insertable into a lid (25) of said opening device to connect said lid (25) to a closing element (10) closing a pouring opening (14) of said opening device; the welding promoting element comprises a sheet element (31) provided with a layer (32) of electrically conductive material, with a first layer (33) of heat-sealable plastic material and with a second layer (34) of heat-sealable plastic material arranged on opposite sides of said layer (32), said layer (32) having a
(Continued)

thickness comprised in the range 5-15 μm and each of said first layer (33) and second layer (34) having a thickness comprised in the range 10-50 μm.

15 Claims, 4 Drawing Sheets

(51) Int. Cl.
  *B32B 3/30* (2006.01)
  *B32B 7/12* (2006.01)
  *B32B 15/20* (2006.01)
(52) U.S. Cl.
  CPC ........ *B65D 47/123* (2013.01); *B32B 2250/03* (2013.01); *B32B 2250/40* (2013.01); *B32B 2307/202* (2013.01); *B32B 2307/31* (2013.01); *B32B 2307/732* (2013.01); *B32B 2435/02* (2013.01)
(58) Field of Classification Search
  CPC  B65D 2251/023; B65D 47/36; B65D 77/067; B65D 17/12; B65D 17/166; B65D 41/20; B65D 41/50; B65D 43/02; B65D 43/0225; B65D 43/0277; B65D 51/20; B65D 51/22; B65D 51/222; B65D 47/123; B32B 15/085; B32B 3/30; B32B 15/20; B32B 7/12; B32B 2250/40; B32B 2307/202; B32B 2435/02; B32B 2307/31; B32B 2250/03; B32B 2307/732
  See application file for complete search history.

(56) References Cited

U.S. PATENT DOCUMENTS

| | | | |
|---|---|---|---|
| 4,588,099 A * | 5/1986 | Diez | B65D 51/20 215/232 |
| 4,813,578 A | 3/1989 | Gordon et al. | |
| 5,089,321 A * | 2/1992 | Chum | B32B 27/32 428/218 |
| 5,388,731 A * | 2/1995 | Mengeu | B29C 45/4407 215/277 |
| 6,247,605 B1 * | 6/2001 | Fujie | B65D 47/103 215/256 |
| 6,279,789 B1 * | 8/2001 | Krall | B65D 41/20 220/254.1 |
| 6,382,462 B1 * | 5/2002 | Ostergaard-Nielsen | B65D 5/749 222/1 |
| 6,916,516 B1 * | 7/2005 | Gerber | B32B 3/30 206/807 |
| 10,040,597 B2 * | 8/2018 | Martini | B65D 5/747 |
| 10,196,178 B2 * | 2/2019 | Martini | B65D 41/0485 |
| 10,414,551 B2 * | 9/2019 | Martini | B65D 41/3428 |
| 2007/0007229 A1 * | 1/2007 | Yousif | B29C 65/76 215/232 |
| 2010/0140271 A1 * | 6/2010 | Benedetti | B65D 51/228 220/361 |
| 2010/0189976 A1 * | 7/2010 | Snyder | B32B 27/12 428/215 |
| 2013/0260976 A1 * | 10/2013 | Schmidt | B32B 7/06 493/128 |
| 2014/0319139 A1 * | 10/2014 | Johansen | B32B 27/308 220/269 |
| 2016/0325471 A1 * | 11/2016 | Martini | B29C 31/048 |
| 2016/0325879 A1 * | 11/2016 | Martini | B65D 5/749 |
| 2017/0327276 A1 * | 11/2017 | Martini | B65D 41/0485 |
| 2018/0327146 A1 * | 11/2018 | Martini | B65D 41/0485 |

OTHER PUBLICATIONS

International Search Report in corresponding PCT Application No. PCT/EP2017/0540698 dated Apr. 7, 2017 (2 pages).

* cited by examiner

WELDING PROMOTING ELEMENT FOR A CLOSURE OF AN OPENING DEVICE

CROSS-REFERENCE TO RELATED PATENT APPLICATIONS

This is a National Phase of International Application No. PCT/EP2017/054068, filed Feb. 22, 2017, which claims the benefit of European Application No. 16158756.3 filed Mar. 4, 2016. The entire contents of the above-referenced applications are expressly incorporated herein by reference.

TECHNICAL FIELD

The present invention relates to a welding promoting element for a closure of an opening device for a container, in particular for a sealed container for packaging pourable food products.

More specifically, the present invention relates to a welding promoting element for a closure of an opening device designed to be directly applied onto a sheet packaging material, in turn adapted to be folded, filled with a pourable food product and sealed to form a finished container.

BACKGROUND OF INVENTION

As known, many pourable food products, such as fruit juice, UHT (ultra-high-temperature treated) milk, wine, tomato sauce, etc., are sold in containers made of sterilized sheet packaging material.

A typical example of this type of containers is the parallelepiped-shaped container for liquid or pourable food products known as Tetra Brik Aseptic (registered trademark), which is made by folding and sealing laminated strip packaging material.

The packaging material has a multilayer structure substantially comprising a base layer for stiffness and strength, which may include a layer of fibrous material, e.g. paper, or mineral-filled polypropylene material, and a number of lamination layers of heat-sealable plastic material, e.g. polyethylene films, covering both sides of the base layer.

In the case of aseptic containers for long-storage products, such as UHT milk, the packaging material also comprises a layer of gas-barrier material, e.g. aluminium foil or ethyl vinyl alcohol (EVOH) film, which is superimposed on a layer of heat-sealable plastic material, and is in turn covered with another layer of heat-sealable plastic material forming the inner face of the container eventually contacting the food product.

Containers of this sort are normally produced on fully automatic packaging machines, which are fed with a web of packaging material that is sterilized on the packaging machine, e.g. by applying a chemical sterilizing agent, such as a hydrogen peroxide solution, which, once sterilization is completed, is removed from the surfaces of the packaging material, e.g. evaporated by heating. The web of packaging material so sterilized is then maintained in a closed, sterile environment, and is folded and sealed longitudinally to form a vertical tube.

The tube is filled with a sterilized or sterile-processed food product, and is sealed and subsequently cut along equally spaced cross sections to form pillow packs, which are then folded mechanically to form respective finished, e.g. substantially parallelepiped-shaped, containers.

Alternatively, the packaging material may be cut into blanks, which are formed into containers on forming spindles, and the containers are filled with the food product and sealed. One example of this type of container is the so-called "gable-top" container known by the trade name Tetra Rex (registered trademark).

To open the containers described above, various solutions have been proposed, including reclosable opening devices made of plastic material and substantially comprising a pouring spout, defining a through pouring opening and fitted to a hole in a wall of the container.

When producing the opening device, the opening of the pouring spout is sealed by a closing element connected integrally to the pouring spout and detachable from it along a tear line. The closing element extends at the same level as the packaging material, so as to seal the hole in the wall of the container. On the side facing the lid, the closing element has an integral projecting pull ring, the free end of which is pulled by the user to detach the closing element from the pouring spout along the tear line and so open the pouring opening. More specifically, the pull ring extends inside, and at a predetermined distance from, the pouring spout.

It is also possible to fix the closing element of the opening device directly over a prelaminated hole in the packaging material, i.e. a hole formed in the base layer only and covered by the other lamination layers, including the layer of gas-barrier material.

In both cases, a removable, e.g. a screw lid, is subsequently fitted to the pouring spout in order to outwardly close the latter.

EP2886479 discloses an opening device having a closing element that is formed in one piece with a protruding portion extending inside the pouring spout and welded to the lid. The latter is provided with a disk-shaped welding promoting element that is welded to the protruding portion so that, when removing the lid from the pouring spout, the protruding portion and the closing element remain attached to the lid.

The welding promoting element has to be fixedly connected to the lid and to the protruding portion in order to allow a one-step-opening of the opening device, i.e. to assure that the closing element remains attached to the lid, through the protruding portion, when the lid is removed from the spout for the first time.

Therefore, the need is felt for a strong connection between the welding promoting element, the lid and the closing element.

DISCLOSURE OF INVENTION

It is an object of the invention to improve the welding promoting elements to be used in closures of opening devices for containers.

It is another object of the invention to provide a welding promoting element that assures a strong connection between a closing portion of an opening device and a lid of a closure of the opening device.

It is another object of the invention to provide a welding promoting element that significantly limits, or even avoids, detachment of a lid of a closure of an opening device from a closing element of the opening device, when the opening device is opened for the first time.

According to the present invention, there is provided a welding promoting element as claimed in claim 1.

BRIEF DESCRIPTION OF THE DRAWINGS

A preferred, non-limiting embodiment of the present invention will be described by way of example with reference to the accompanying drawings, in which.

DETAILED DESCRIPTION OF PREFERRED EMBODIMENTS

Number 1 in FIGS. 1, 3, 4 and 8 indicates as a whole a reclosable opening device 1 for a container 100, in particular a sealed container for packaging pourable food products.

Figure 1:
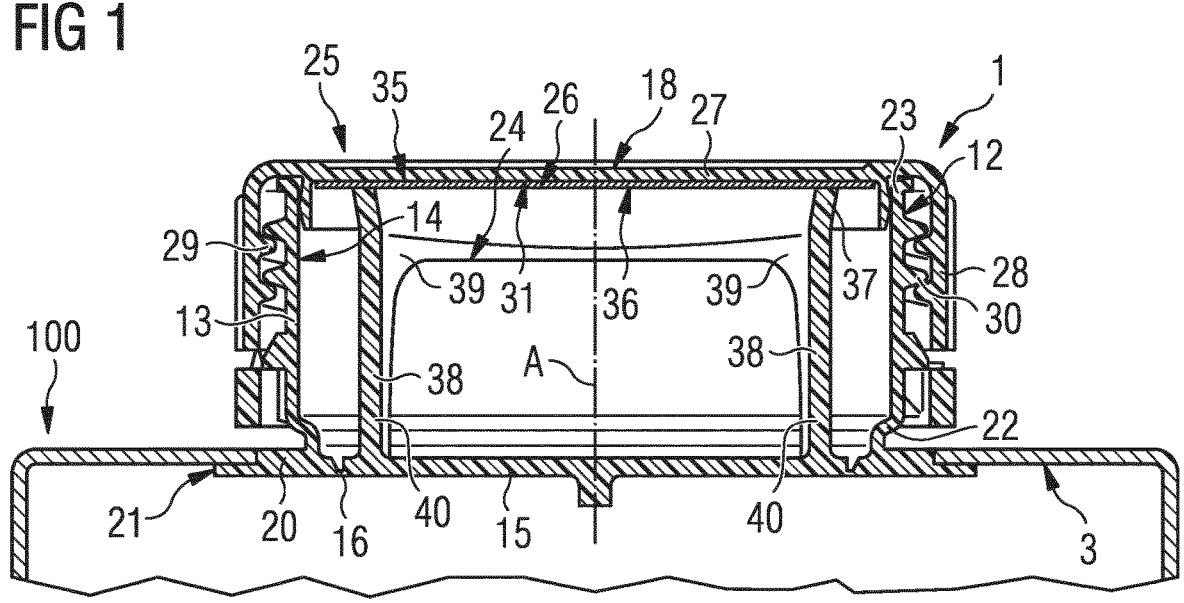
FIG. 1 shows an axial section of an opening device provided with a welding promoting element according to the invention and applied on a receiving portion of a sheet packaging material forming a container.
Figure 8:
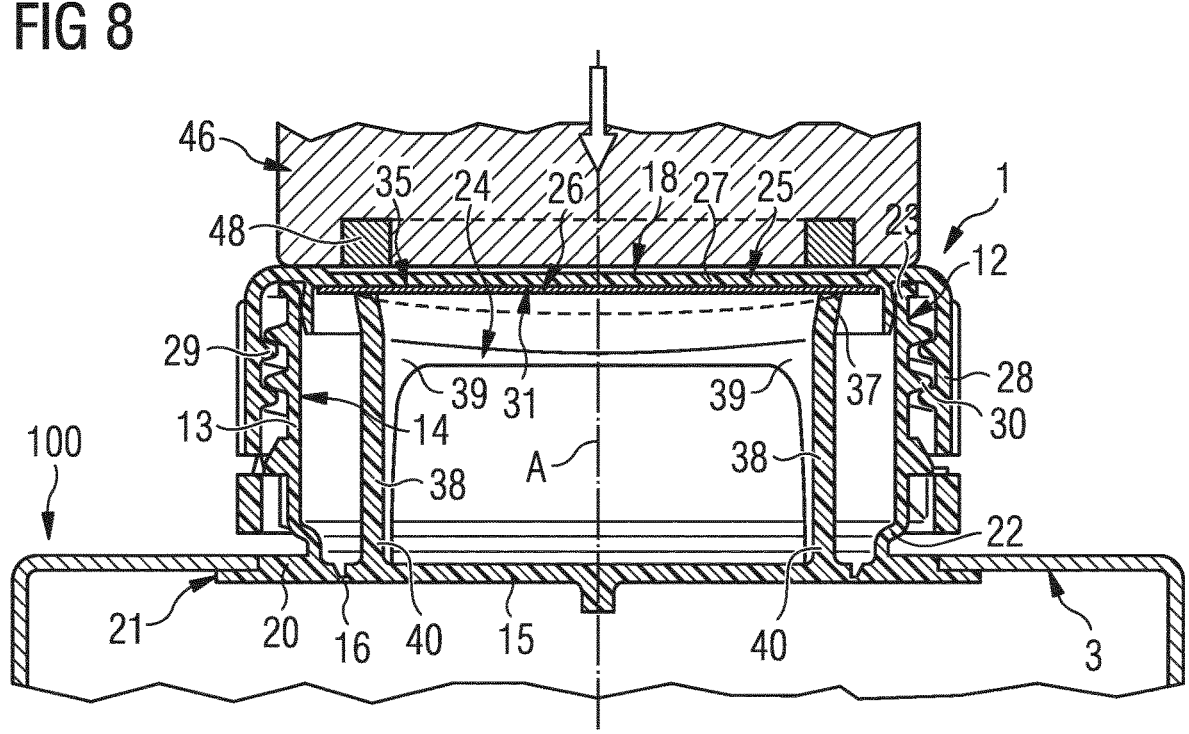
FIG. 8 is an axial section like the one in Figure and shows the container provided with the opening device during a final step of the method for producing the opening device.

In the example shown in FIGS. 1 and 8, the opening device 1 is applied to a receiving portion 2 (FIG. 2) of a multilayer sheet packaging material 3, in turn folded, filled with a pourable food product and sealed in a known manner to form the container 100.

Figure 2:
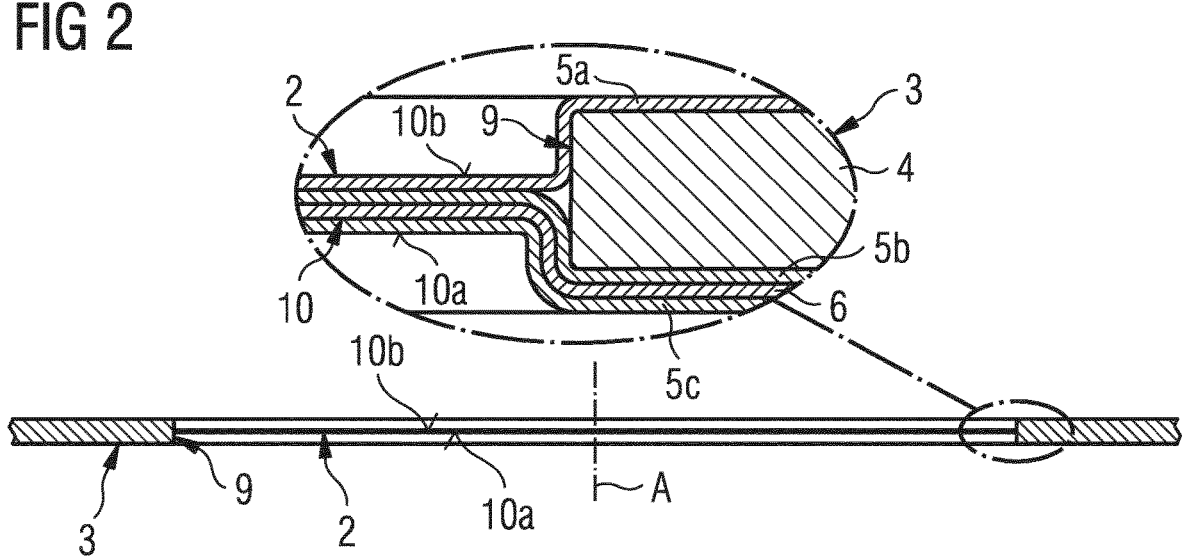
FIG. 2 shows a larger-scale section of the sheet packaging material of FIG. 1 before the opening device is applied thereto.

With particular reference to FIG. 2, the packaging material 3 comprises a base layer 4 for stiffness and strength, which may be made of fibrous material, e.g. paper, or mineral-filled polypropylene material, and a first layer 5a of heat-sealable plastic material, e.g. polyethylene film, and a second layer 5b of heat-sealable plastic material, e.g. polyethylene film, covering both sides of the base layer 4.

In the case of an aseptic container for long-storage products, such as UHT milk, the packaging material 3 also comprises a barrier layer 6 of gas-barrier material, e.g. aluminium foil or ethyl vinyl alcohol (EVOH) film, which is superimposed on the second layer 5b of heat-sealable plastic material, and is in turn covered with a third layer 5c of heat-sealable plastic material forming the inner face of the container eventually contacting the food product.

In other words, the first layer 5a, the second layer 5b, the third layer 5c and the barrier layer 6 define respective lamination layers applied to the base layer 4 when producing packaging material 3 in the form of a continuous strip.

In the example shown, the receiving portion 2 is defined by a so-called pre-laminated hole, i.e. a hole 9 formed through the base layer 4 and covered by the lamination layers, i.e. the first layer 5a, the second layer 5b, the third layer 5c and the barrier layer 6, so that the hole 9 is sealed by a sheet cover portion 10.

In a possible alternative embodiment not shown, the cover portion 10 may even be defined by only one or some of the lamination layers. For example, the cover portion 10 may be made solely of gas-barrier material.

In another possible alternative embodiment not shown, the cover portion 10 may be defined by a patch fixed to the rest of the packaging material 3 to seal a hole formed, in this case, through the full thickness of such packaging material 3.

In a further alternative embodiment not shown, the receiving portion 2 may be simply defined by a hole formed through the full thickness of the packaging material 3 and which is destined to be sealed by the opening device 1.

With reference to FIGS. 1, 3, 4 and 8, the opening device 1 has an axis A, which in use is substantially perpendicular to the receiving portion 2 of the packaging material 3.

The opening device 1 basically comprises:

a pouring spout 12 fixed to the packaging material 3 at the hole 9 and having a cylindrical tubular neck 13 of axis A, defining a pouring opening 14, by which to pour in use the content of the container 100;

a closing element 15 closing or sealing the pouring opening 14 and integrally connected to the pouring spout 12 by a smaller-section, annular membrane 16 adapted to be easily torn in use; and a closure 18 fitted to the neck 13 of the pouring spout 12 in a removable manner to close or seal the pouring opening 14 at a region thereof different from that closed by closing element 15.

The annular membrane 16 defines a tear line along which to detach in use the closing element 15 from the pouring spout 12.

In one embodiment of the present invention, the pouring spout 12 and the closing element 15 are formed in one piece on the receiving portion 2 of the packaging material 3, whilst the closure 18 is formed separately from the pouring spout 12 and the closing element 15 and then fitted thereto.

In the embodiment disclosed in FIGS. 1 to 4 and 8, the pouring spout 12 and the closing element 15 are obtained by molding molten plastic material—in particular by an injection molding operation—on the packaging material 3 before it is transformed in the container 100.

More specifically, the plastic material destined to form the pouring spout 12 and the closing element 15 is injected in a molten state onto a first side 10a—i.e. the side eventually facing inwards of the final container—of the cover portion 10 placed in a known manner within a molding apparatus (known per se and not shown). In particular, the molten plastic material covers the first side 10a of the cover portion 10 up to an annular peripheral region thereof so as to form, in this way, the closing element 15 directly attached to the cover portion 10. The molten plastic material is then forced to pierce the cover portion 10 at such annular peripheral region to form the pouring spout 12 projecting from a second side 10b of the cover portion 10. The second side 10b is opposite to the first side 10a. The second side 10b is the side eventually facing outwards of the final container 100.

The pouring spout 12 is attached to the closing element 15 through the smaller-section annular membrane 16, which is in turn adapted to be torn by the user to open the container 100.

In this way, the material forming the pre-laminated hole is first pierced through and then resealed by the plastic material forming the pouring spout 12.

In practice, the neck 13 of pouring spout 12 extends through the cover portion 10 as a follow-on from the piercing thereof so as to be arranged on both the first side 10a and the second side 10b of the cover portion 10.

The closing element 15 and the cover portion 10 of the hole 9 together define a sealing portion sealing the pouring opening 14 of the pouring spout 12. The closing element 15 substantially has a confetti shape.

According to a possible alternative not shown, the plastic material destined to form the pouring spout 12 and the closing element 15 may be also directly injected in a molten state through a hole of the packaging material 3 so that such hole is then completely sealed by the closing element 15 only.

As shown particularly in FIGS. 1, 3, 4 and 8, the pouring spout 12 further comprises an annular flange 20 fixed to the packaging material 3 at the edge of the hole 9. The neck 13 projects axially and integrally from an annular region of the flange 20 radially interposed between an outer edge 21 of the flange 20 and the annular membrane 16.

In practice, the closing element 15 defines a prolongation of the flange 20 inside the pouring spout and closes or seals a first axial end 22 of the pouring spout 12; in a different manner, the closure 18 seals a second axial end 23, opposite to the first axial end 22, of the pouring spout 12 even after removal in use of the closing element 15 and the cover portion 10.

The closing element 15 is advantageously formed in one piece with a protruding portion 24 extending through the pouring opening 14 and welded to the closure 18 far away from the closing element 15. In other words, the protruding portion 24 is welded to the closure 18 at a given, not null, axial distance from the closing element 15.

With reference to FIGS. 1 and 3 to 8, the closure basically comprises a lid 25 and a disk-shaped welding promoting element 26 to connect the lid 25 to the protruding portion 24.

In particular, the lid 25 comprises a disk-shaped end wall 27, closing the pouring opening 14 of the pouring spout 12 at the second end 23 thereof, and a cylindrical lateral wall 28 cooperating with the outer surface of the neck 13 of the pouring spout 12.

In the example shown, the lid 25 is of a screw type and the lateral wall 28 has an inner thread 29, which engages a corresponding outer thread 30 on the neck 13 of the pouring spout 12.

The lid 25 further comprises integrally an annular rib 27a axially protruding from the end wall 27 towards the inside of the lid 25 and defining a seat 27b for receiving the welding promoting element 26.

Figure 3:
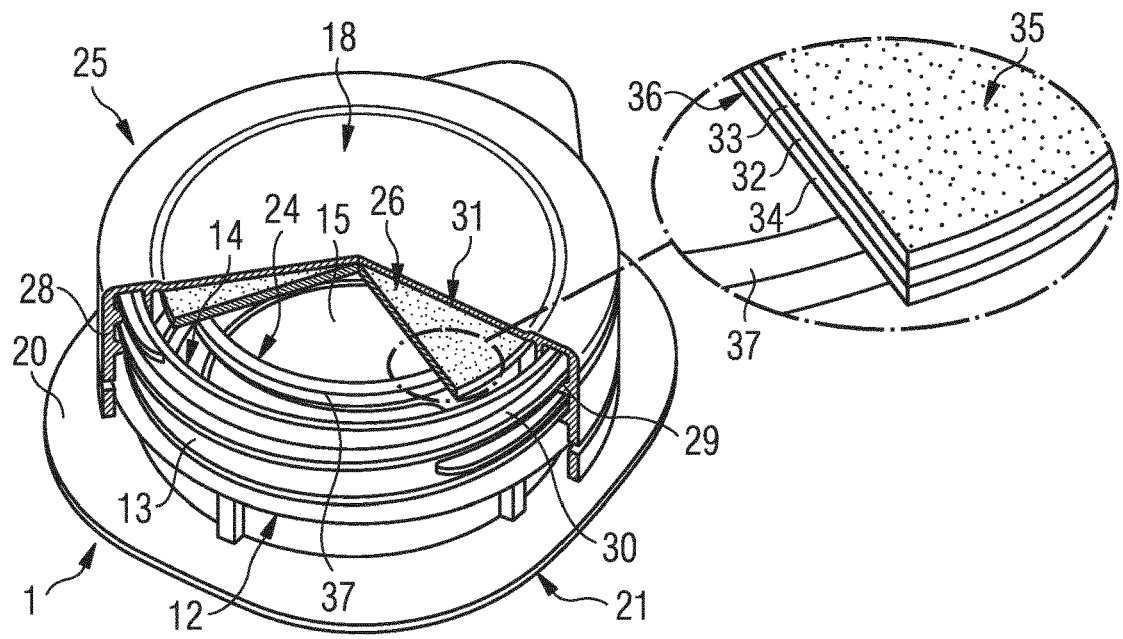
FIG. 3 shows a partly-sectioned perspective view of the opening device of FIG. 1.

As shown in FIGS. 1 and 3, the welding promoting element 26 is defined by a multilayer sheet element 31 distinct from the lid 18 and permanently connected to the lid 25.

The sheet element 31 comprises a layer 32 of electrically conductive material, e.g. an aluminum foil, and a first layer 33 of heat-sealable plastic material and a second layer 34 of heat-sealable plastic material that cover both sides of the layer 32. The first layer 33 defines a first face 35 of the sheet element 31 and the second layer 34 defines a second face 36—opposite to the first face 35—of the sheet element 31.

In the embodiment shown, the first face 35 of the sheet element 31 is configured to be welded to the end wall 27 by the heat generated by inducing an electric current in the layer 32. Similarly, the face 36 of the sheet element 31 is configured to be welded to the protruding portion 24 by the heat generated by inducing an electric current in the layer 32.

Figure 4:
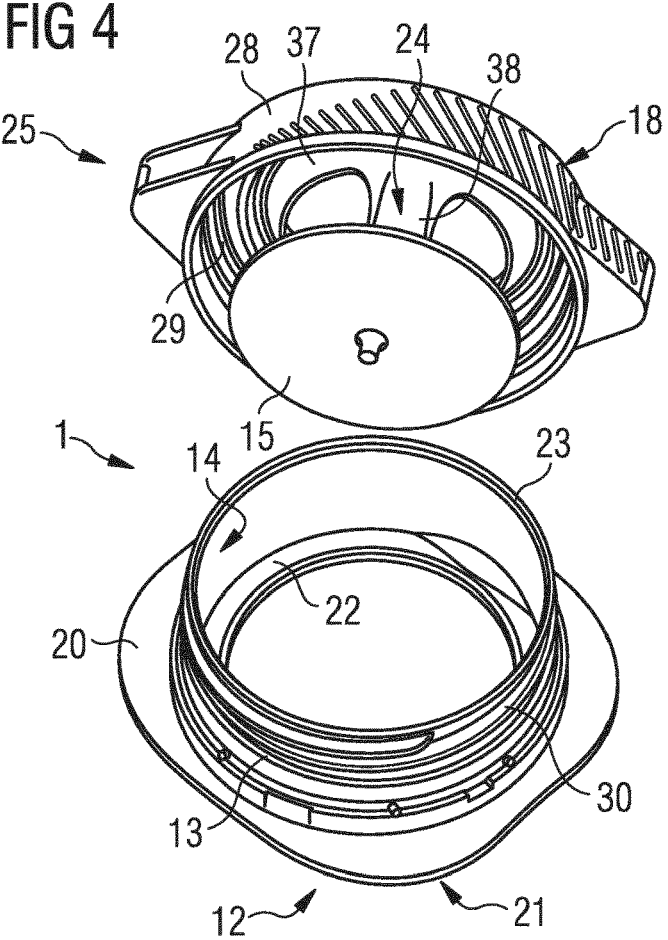
FIG. 4 shows a perspective view of the opening device of FIG. 1 in an open condition.
Figure 5:
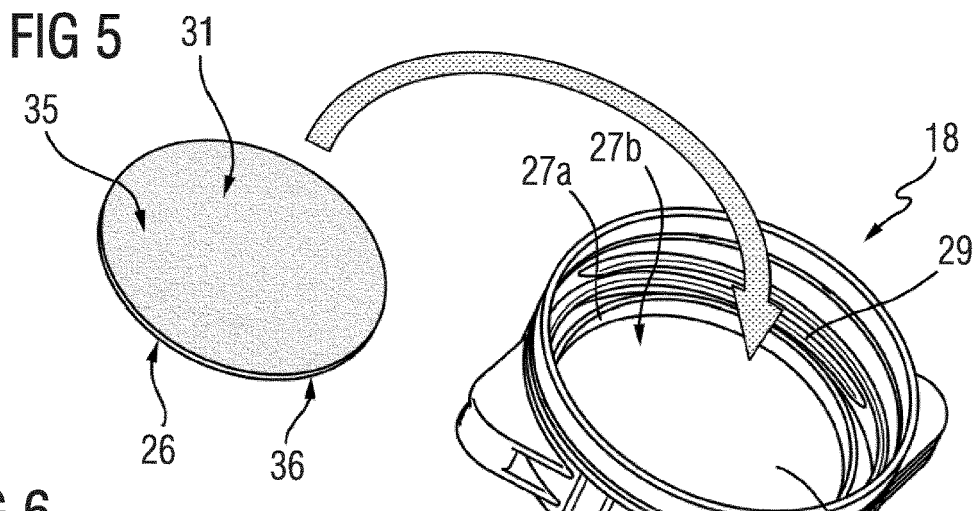
FIG. 5 shows a perspective view of a closure of the opening device of FIG. 1 during a step for producing the closure.
Figure 6:
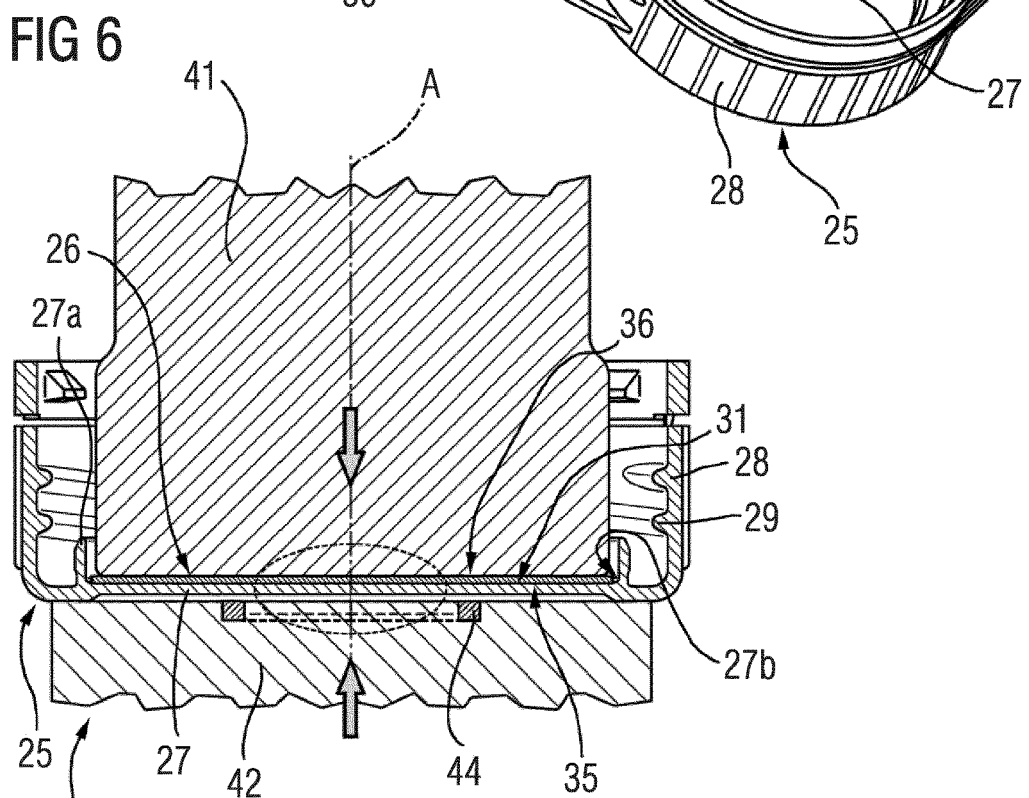
FIG. 6 shows an axial section of the closure of FIG. 5 during another step for producing the closure.
Figure 7:
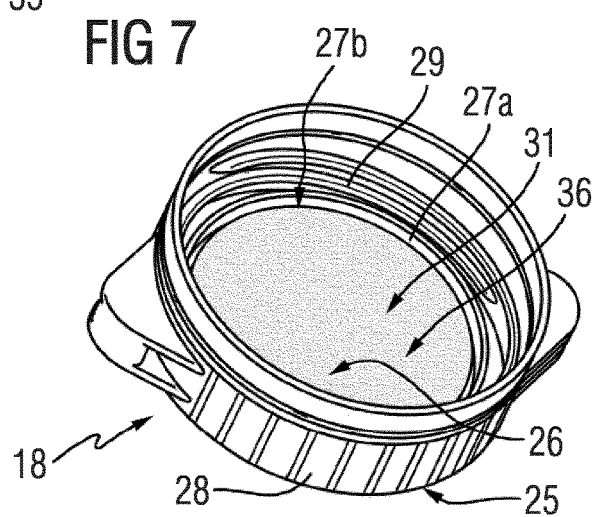
FIG. 7 shows a perspective view of the closure of FIG. 5 after production thereof.

As shown in FIGS. 1, 3 and 4, the protruding portion 24 comprises an annular body 37, welded to the second face 36 of the sheet element 31, and two legs 38 integrally connecting the annular body 37 to the closing element 15. In particular, the legs 38 have first ends 39, integrally connected to respective diametrically opposite portions of the annular body 37 with respect to axis A, and second ends 40 integrally connected to the closing element 15.

As a possible alternative not shown, the legs 38 may be also not diametrically opposite one another.

As a further possible alternative not shown, the protruding portion 24 may comprise more than two legs 38 angularly spaced from each other.

Figure 9:
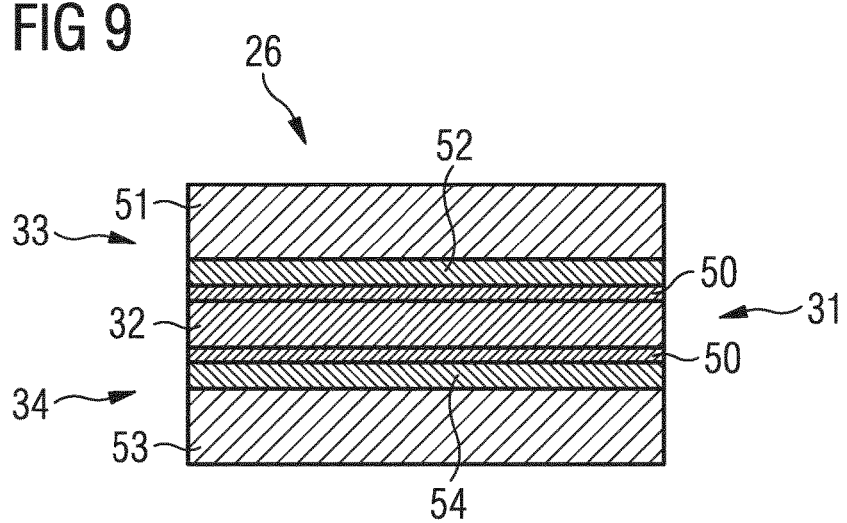
FIG. 9 is a cross section of the welding promoting element according to the invention.

In FIG. 9 there is shown in greater detail that the welding promoting element 26 comprises the sheet element 31 and the sheet element 31 comprises the layer 32 of electrically conductive material, the first layer of heat-sealable plastic material and the second layer 34 of heat-sealable plastic material, which are arranged on opposite sides of the layer 32.

The layer 32 has a thickness belonging to the range 5-15 µm.

Each one of the first layer 33 and the second layer 34 has a thickness belonging to the range 10-50 µm.

In one embodiment, each one of the first layer 33 and the second layer 34 has a thickness belonging to the range 15-30 µm.

In one embodiment, the first layer 33 and the second layer 34 are made of a heat-sealable plastic material selected in a group comprising: polyethylene-based material, polypropylene-based material.

In one embodiment, the first layer 33 and the second layer are made of the same material, i.e. they are both made of polyethylene-based material, or both made of polypropylene-based material.

In one embodiment, an adhesive 50 is interposed between the layer 32 and the first layer 33 and between the layer 32 and the second layer 34 so as to increase adhesion between the layer 32 and the first layer 33 and between the layer 32 and the second layer 34, respectively.

In one embodiment, the adhesive is a polyurethane-based adhesive.

In one embodiment the first layer 33 comprises a first layer element 51 and a further first layer element 52.

The further first layer element 52 is interposed between the first layer element 51 and the layer 32. The first layer element 51 defines the first face 35.

The first layer element 51 has a thickness comprised in a range of 5-40 µm.

The further first layer element 52 has a thickness comprised in a range of 5-10 µm.

In one embodiment, the first layer element 51 has a thickness comprised in a range of 10-20 µm.

In one embodiment, the first layer element 51 is made of Low Density Polyethylene (LDPE).

In one embodiment, the further first layer element 52 is made of Linear Low Density Polyethylene (LLDPE).

In one embodiment the second layer 34 comprises a second layer element 53 and a further second layer element 54.

The further second layer element 54 is interposed between the second layer element 53 and the layer 32.

The second layer element 53 defines the second face 36.

The second layer element 53 has a thickness comprised in a range of 5-40 µm.

The further second layer element 54 has a thickness comprised in a range of 5-10 µm.

In one embodiment, the second layer element 53 has a thickness comprised in a range of 10-20 µm.

In one embodiment, the second layer element 53 is made of Low Density Polyethylene (LDPE).

In one embodiment, the further second layer element 54 is made of Linear Low Density Polyethylene (LLDPE).

In one embodiment, the layer 32 has a thickness of 12 µm, the first layer element 51 has a thickness of 18 µm, the further first layer element 52 has a thickness of 7 μm, the second layer element 53 has a thickness of 18 μm and the further second element has a thickness of 7 μm.

In one embodiment, the sheet element 31 of the welding promoting element 26 has a structure that is symmetrical with respect to the layer 32, in other words the first layer 33 has the same thickness as the second layer 34.

In one embodiment, the first layer element 51 and the second layer element 53 have the same thickness. Moreover the further first layer element 52 and the further second layer element 54 have the same thickness.

The sheet element 31 of the welding promoting element 26 has a structure that is symmetrical with respect to the layer 32 also because the first layer 33 is made of the same heat-sealable plastic material as the second layer 34.

In one embodiment, the first layer element 51 is made of the same heat-sealable plastic material as the second layer element 52. Moreover, the further first layer element 53 is made of the same heat-sealable plastic material as the further second layer element 54.

In one embodiment, the layer 32 is embossed, in other words the layer 32—and therefore the welding promoting element 26—comprises a plurality of cavities on one side of the sheet element 31 and a corresponding plurality of bulges on the opposite side of the sheet element 31.

The opening device 1 is produced as follows.

First of all, the pouring spout 12 and the closing element 15 are injection molded in one piece onto the receiving portion 2 of the packaging material 3.

In particular, the packaging material 3 is placed with the receiving portion 2 inside a molding apparatus; at this point, the molten plastic material is injected onto the first side 10a of the cover portion 10 and flows along the first side 10a up to the annular peripheral region thereof so as to form, in this way, the closing element 15 directly attached to the cover portion 10. The molten plastic material is then forced to pierce the cover portion 10 at such annular peripheral region to form the pouring spout 12 projecting from the second side 10b of the cover portion 10 and attached to the closing element 15 through the annular membrane 16. In practice, the material forming the cover portion 10 is first pierced through and then resealed by the plastic material forming the pouring spout 12.

At this point, the packaging material 3 is sterilized and then folded, filled with a pourable food product and sealed in a known manner to obtain the container 100.

The closure 18 is produced separately from the pouring spout 12 and the closing element 15 and then fitted thereto.

In particular, after forming the lid 25 and the sheet element 31, the latter is inserted into the seat 27b of the lid 25 with the face 35 in contact with the end wall 27. The assembly so formed is then inserted between a pressure element 41 and an electric induction generating element 42 of an induction heating welding apparatus 43. More specifically, in the example shown in FIG. 6, the pressure element 41 also engages the seat 27b of the lid 25 and cooperates with the face 36 of the sheet element 31.

The electric induction generating element 42 comprises a coil 44 and cooperates with an external surface of the end wall 27 of the lid 25 opposite the surface of the end wall 27 cooperating with the sheet element 31.

By activating the coil 44, an electric current is induced in the layer 32 of electrically conductive material of the sheet element 31, with a consequent generation of localized heat producing the welding of the face 35 of heat-sealable plastic material to the end wall 27 of lid 25.

The closure 18 is then fitted to pouring spout 12 of container 100 with reciprocal engagement of the inner thread 29 and the outer thread 30.

At this point, the container 100 with the opening device 1 cooperates with an electric induction generating element 46 (see FIG. 8). More specifically, the electric induction generating element 46 is similar to the electric induction generating element 42 and comprises a coil 48.

The electric induction generating element 46 cooperates with the external surface of the end wall 27 of the lid 25 opposite the surface of the end wall 27 cooperating with the sheet element 31.

By activating the coil 48, an electric current is induced in the layer 32 of electrically conductive material of the sheet element 31, with a consequent generation of localized heat producing the welding of the face 36 of heat-sealable plastic material to the annular body 37 of the protruding portion 24.

This induction heating welding operation is performed at a distance, non null, along the axis A from the closing element 15 and, therefore, from the adjacent packaging material 3, with no risk to damage it.

According to a possible alternative not shown, the closure 18 may be fitted to the pouring spout 12 and welded to the protruding portion 24 of the closing element 15 by an induction heating welding operation carried out directly on the packaging material 3 in the form of a web, i.e. before such packaging material 3 is transformed in the finished container 100.

In actual use, the first opening of the container is obtained by rotating the lid 25 with respect to the pouring spout 12 about the axis A. At the beginning of the rotation impressed by the user on the lid 25, the legs 38 bend in the direction of rotation, so exerting a pulling action on the closing element 15 at a given point of the annular membrane 16; in other words, due to the presence of the bending legs 38, the torque exerted on the lid 25 is transformed in a pulling action on the closing element 15, which starts to detach from the pouring spout 12 at two given points along the annular membrane 16.

By continuing to rotate the lid 25, it unscrews completely from the pouring spout 12 together with the closing element 15, which remains attached to the lid 25 (see FIG. 4) and therefore fully detaches along the annular membrane 16 from the pouring spout 12.

Owing to the welding promoting element according to the invention it is possible to strongly and reliably connect the lid to the closing element.

In particular, it has been found that with a first layer of heat-sealable plastic material and a second layer of heat-sealable plastic material having the claimed thicknesses it is possible to prevent the detachment of the lid and the closing element during first opening of the opening device.

The adhesion of the lid and the closing element is also enabled by the use of polyethylene-based material, or polypropylene-based material, as the heat-sealable plastic material.

The firm mutual attachment of the lid and the closing element is also improved by the adhesive, particularly by the polyurethane-based adhesive.

In addition, it has been found that a good welding of the lid and the closing element is obtained by using a welding promoting element in which the sheet element has a structure that is symmetrical with respect to the layer of electrically conductive material, in particular a welding promoting element in which the first layer of heat-sealable plastic material is made of the same material of, and has the same thickness as, the second layer of heat-sealable plastic material. In one case, the first layer element of the first layer and the second layer element of the second layer are made of the same material and have the same thickness. Similarly, the further first layer element of the first layer and the further second layer element of the second layer are made of the same material and have the same thickness.

In this way, the welding promoting element exerts the same welding promoting action both on the lid and on the closing element, so strongly bonding the lid and the closing element to each other.

In particular, in case the first layer element and the second layer element are made of Low Density Polyethylene (LDPE) and the further first layer element and the further second layer element are made of Linear Low Density Polyethylene (LLDPE), the welding promoting element combines together good sealing properties, given by the outer layers of Low Density Polyethylene (LDPE), and good elasticity, given by the inner layers of Linear Low Density Polyethylene (LLDPE).

Finally, in case the layer of electrically conductive material is embossed, the welding promoting element has an improved sealability since the bulges projecting from the sheet element acts as areas of localized increased melting of the heat-sealable plastic material. In other words, the heat-sealable plastic material is more easily melted at the bulges of the sheet element so improving the welding promoting capability of the welding promoting element.

Clearly, changes may be made to the welding promoting element without, however, departing from the scope of protection as defined in the accompanying claims.

The invention claimed is:

1. A welding promoting element for an opening device, the welding promoting element being insertable into a lid of the opening device to connect the lid to a closing element closing a pour opening of the opening device, the welding promoting element comprising:
   a sheet element comprising:
      a conductive layer of electrically-conductive material,
      a first layer of heat-sealable plastic material, and
      a second layer of heat-sealable plastic material arranged on opposite sides of the conductive layer,
   wherein:
      the conductive layer has a thickness in the range of 5-15 µm,
      each of the first layer and second layer has a thickness in the range of 10-50 µm,
      the first layer comprises a first layer element and a further first layer element that is interposed between the first layer element and the conductive layer,
      the second layer comprises a second layer element and a further second layer element that is interposed between the second layer element and the conductive layer.

2. The welding promoting element of claim 1, wherein each of the first layer and second layer has a thickness in the range of 15-30 µm.

3. The welding promoting element of claim 1, wherein the first layer and the second layer are made of a heat-sealable plastic material selected from a group comprising: polyethylene-based material and polypropylene-based material.

4. The welding promoting element of claim 1, wherein the first layer element and the second layer element are made of Low Density Polyethylene (LDPE) and wherein the further first layer element and the further second layer element are made of Linear Low Density Polyethylene (LLDPE).

5. The welding promoting element of claim 1, wherein the conductive layer has a thickness of 12 µm, the first layer element has a thickness of 18 µm, the further first layer element has a thickness of 7 µm, the second layer element has a thickness of 18 µm and the further second element has a thickness of 7 µm.

6. The welding promoting element of claim 1, wherein the conductive layer is embossed.

7. The welding promoting element of claim 1, wherein an adhesive is interposed between the conductive layer and the first layer and between the conductive layer and the second layer.

8. The welding promoting element of claim 7, wherein the adhesive is a polyurethane-based adhesive.

9. The welding promoting element of claim 1, wherein each of the first layer element and the second layer element has a thickness in a range of 5-40 µm and wherein each of the further first layer element and further second layer element has a thickness in a range of 5-10 µm.

10. The welding promoting element of claim 9, wherein, each of the first layer element and the second layer element has a thickness in a range of 10-20 µm.

11. The welding promoting element of claim 1, wherein the welding promoting element has a structure that is symmetrical with respect to the conductive layer, and wherein the first layer having the same thickness as the second layer.

12. The welding promoting element of claim 11, wherein the first layer and the second layer are made of the same heat-sealable plastic material.

13. The welding promoting element of claim 11, wherein the first layer element has the same thickness as the second layer element and wherein the further first layer has the same thickness as the further second layer.

14. A closure for an opening device of a container, the closure comprising a lid adapted to be fitted to a pouring spout of the opening device, and a welding promoting element, adapted to connect the lid to a closing element of the opening device, the welding promoting element being distinct from the lid and permanently connected to the lid, the welding promoting element being a welding promoting element according to claim 1.

15. An opening device for a container, the opening device comprising:
   a pouring spout defining a pouring opening;
   a closing element closing the pouring opening, wherein the closing element is formed in one piece with the pouring spout and connected to the pouring spout, wherein the closing element is formed with a protruding portion extending through the pouring opening and welded to the closure;
   a closure removably fitted to the pouring spout to close the pouring opening at a region thereof different from that closed by the closing element;
   a lid; and
   a welding promoting element to connect the lid to the protruding portion, wherein the welding promoting element is distinct from the lid and connected to the lid, the welding promoting element being a welding promoting element according to claim 1.

* * * * *